US 6,702,073 B2

United States Patent
Sommerfeld

(10) Patent No.: US 6,702,073 B2
(45) Date of Patent: Mar. 9, 2004

(54) HAND BRAKE LEVER INTERFACE FOR SINGLE-CYLINDER TRUCK-MOUNTED RAILWAY CAR BRAKE

(75) Inventor: Howard Sommerfeld, Oak Forest, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/187,206

(22) Filed: Jul. 2, 2002

(65) Prior Publication Data
US 2004/0003971 A1 Jan. 8, 2004

(51) Int. Cl.$^7$ ............................................... B61H 13/36
(52) U.S. Cl. ...................... 188/219.1; 188/52; 188/33
(58) Field of Search ............................. 188/33, 34, 46, 188/49, 50, 51, 52, 53, 54, 55, 56, 219.1, 220.1, 220.6, 228.6, 233.7

(56) References Cited

U.S. PATENT DOCUMENTS

| 2,940,545 A | * | 6/1960 | Hursen | 188/52 |
| 4,193,480 A | * | 3/1980 | Malo | 188/52 |
| 4,771,868 A | * | 9/1988 | Haydu | 188/52 |
| 5,069,312 A | * | 12/1991 | Kanjo et al. | 188/52 |
| 5,495,921 A | * | 3/1996 | Samulak et al. | 188/202 |
| 6,241,057 B1 | * | 6/2001 | Hiatt | 188/219.1 |
| 6,427,811 B1 | * | 8/2002 | Wedge et al. | 188/162 |

* cited by examiner

Primary Examiner—Matthew C. Graham
Assistant Examiner—Benjamin A Pezzlo
(74) Attorney, Agent, or Firm—James Ray & Associates

(57) ABSTRACT

In combination with a hand brake system for a railway vehicle including first and second spaced-apart brake beams. First and second transfer levers are pivotally connected at a point intermediate the ends thereof to a respective one of the first and second brake beams. First and second force-transmitting members are interconnected between corresponding arms of the first and second transfer levers. Such first force-transmitting member including a brake actuator device operable in response to the supply of fluid pressure thereto for increasing the length of the first force-transmitting member, to accordingly increase the spaced-apart distance between the first and second brake beams. A transfer link is connected to the first transfer lever so as to be arcuately movable therewith in a plane parallel to the plane of rotation of the first transfer lever. The improvement comprises a thrust block disposed on the first brake beam. The thrust block having a pin member disposed therein. There is an actuating lever having a pivotal connection at a location intermediate the ends thereof with the transfer link closely adjacent one end of the actuating lever there is an arcuate portion rotateably engageable with the pin member and being adapted to receive a hand brake force.

18 Claims, 5 Drawing Sheets

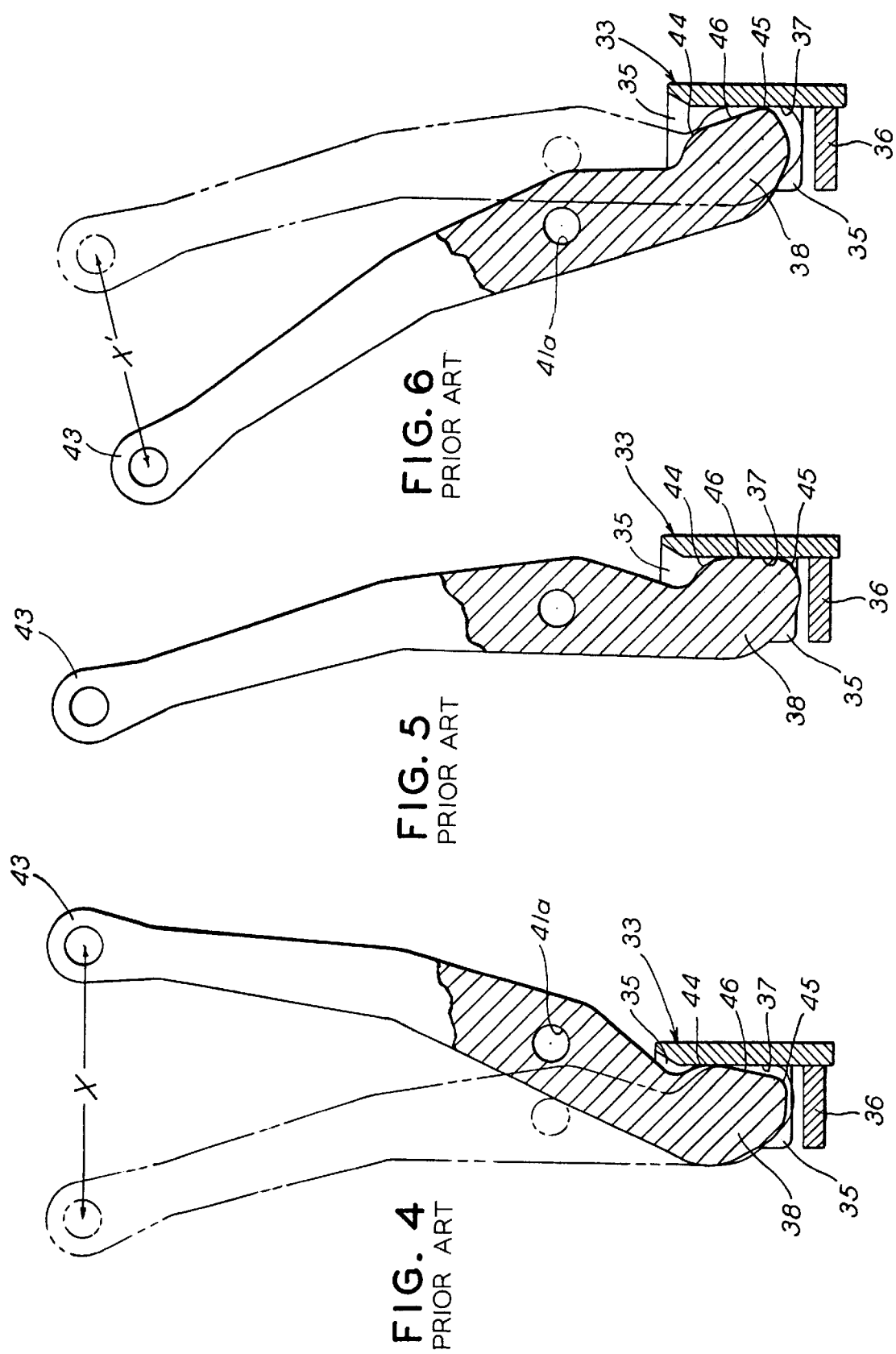

US 6,702,073 B2

HAND BRAKE LEVER INTERFACE FOR SINGLE-CYLINDER TRUCK-MOUNTED RAILWAY CAR BRAKE

FIELD OF THE INVENTION

The present invention relates, in general, to hand brakes for railway freight cars and, more particularly, this invention relates to an improved hand brake lever interface that is suitable for use with a single-cylinder, truck-mounted brake rigging.

BACKGROUND OF THE INVENTION

There is presently known in the prior art a single-cylinder, truck-mounted brake rigging, as shown in U.S. Pat. Nos. 4,613,016 and 4,793,446, which has been designed for use with truss-type brake beams. In this respect, the braking force applied through the rigging acts on the respective brake beams at the beam midpoint where maximum resistance to bending forces is effective by reason of the beam strut arm transferring the load between the beam compression and tension members. Such a single-cylinder rigging, when combined with truss-type brake beams, is believed to offer maximum efficiency of operation at a relatively low cost.

In U.S. Pat. No. 5,069,312 there is taught a hand brake for a single cylinder truck mounted railway car brake. This patent is assigned to the assignee of the present invention and the teachings therein are is incorporated herein by reference thereto.

Disclosed therein is a hand brake system for use with a truck mounted single cylinder brake rigging which includes a truss type brake beam. There is a single hand brake pivotal lever supported intermediates its ends by a twisted transfer link that is, in turn, fixed to the brake rigging transfer lever. A fulcrum end of the hand brake lever is free to engage the bearing surface of thrust block mounted on the brake beam at the juncture of the brake beam tension and struck members in order to allow the point of engagement between the fulcrum end and the bearing surface to change with rotation of the hand brake lever. In addition, the fulcrum end of the hand brake lever is arranged with two, spaced apart arcuate segments that successively engage the bearing surface of the thrust block during rotation of the hand brake lever to change its lever ratio and, accordingly, limit the degree of rotation of the hand brake lever.

SUMMARY OF THE INVENTION

The present invention provides an improved hand brake lever interface for a single cylinder truck-mounted railway car brake for use with a hand brake system for a railway vehicle including first and second spaced-apart brake beams. First and second transfer levers are pivotally connected at a point intermediate the ends thereof to a respective one of the first and second brake beams. First and second force-transmitting members are interconnected between corresponding arms of the first and second transfer levers. Such first force-transmitting member including a brake actuator device operable in response to the supply of fluid pressure thereto for increasing the length of the first force-transmitting member, to accordingly increase the spaced-apart distance between the first and second brake beams. A transfer link is connected to the first transfer lever so as to be arcuately movable therewith in a plane parallel to the plane of rotation of the first transfer lever. The improvement comprises a thrust block disposed on the first brake beam. The thrust block having a pin member disposed therein. There is an actuating lever having a pivotal connection at a location intermediate the ends thereof with the transfer link closely adjacent one end of the actuating lever there is an arcuate portion rotateably engageable with the pin member and being adapted to receive a hand brake force.

OBJECTS OF THE INVENTION

It is, therefore, one of the primary objects of the present invention to provide an improved hand brake lever interface for a single cylinder truck-mounted railway car brake having a pin and lever geometry that will keep the lever properly positioned in the vertical direction which will help reduce the drag force due to misalignment of the cylinder transfer lever and the hand brake transfer link.

Another object of the present invention is to provide an improved hand brake lever interface for a single cylinder truck-mounted railway car brake which is capable of interacting with a brake rigging of the foregoing type so that the hand brake force and the pneumatic power brake force may be applied at the midpoint of the respective brake beams, without requiring any additional levers to transmit the hand brake force from one brake beam to the other.

Another object of the present invention is to provide an improved hand brake lever interface for a single cylinder truck-mounted railway car brake which is capable of applying the desired hand brake force through the pneumatic brake rigging components without imparting any significant torque force on the brake beam and/or rigging components.

A still further object of the invention is to provide an improved hand brake lever interface for a single cylinder truck-mounted railway car brake configured so as to cause the hand brake lever ratio to change during operation in order to limit its range of travel and thereby prevent interference with the truck axle.

It is an additional object of the present invention to provide an improved hand brake lever interface for a single cylinder truck-mounted railway car brake which can be retrofitted onto existing systems.

In addition to the various objects and advantages of the present invention which been described in detail above, various other objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIGS. 4, 5 and 6 are views showing different positions of the prior art hand brake lever to illustrate the dual ratio aspect by which the range of hand brake lever rotation is controlled;

BRIEF DESCRIPTION OF THE PRESENTLY PREFERRED EMBODIMENT OF THE INVENTION

Figure 1:
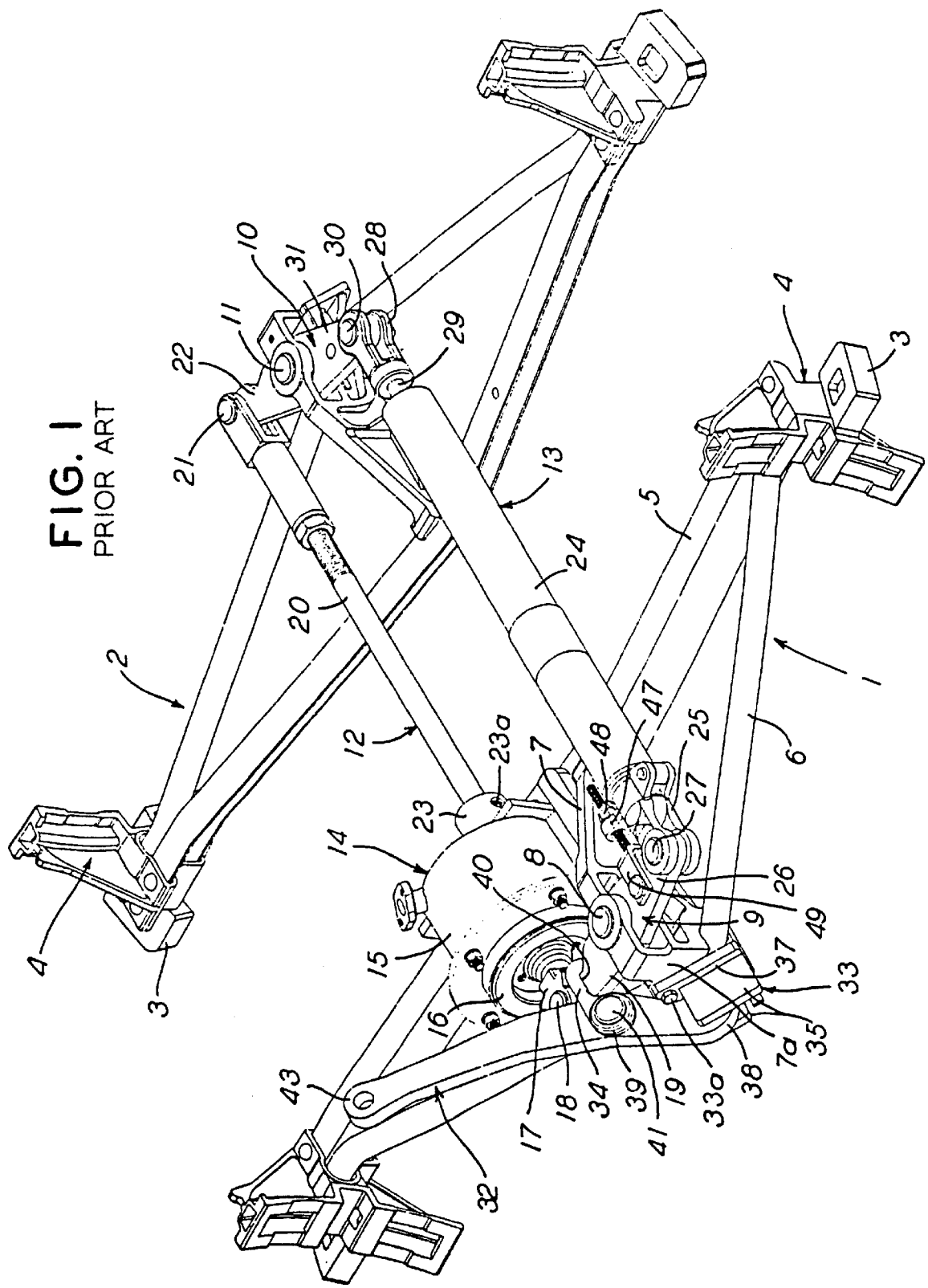
FIG. 1 is an isometric view of a single-cylinder, truck-mountable brake assembly incorporating the prior art hand brake apparatus which can be retrofitted with the hand brake lever or link of the present invention.

Prior to proceeding to the more detailed description of the present it invention it should be noted that, for the sake of clarity, identical components which have identical functions have been identified with identical reference panels throughout the several views illustrated in the drawings.

Figure 2:
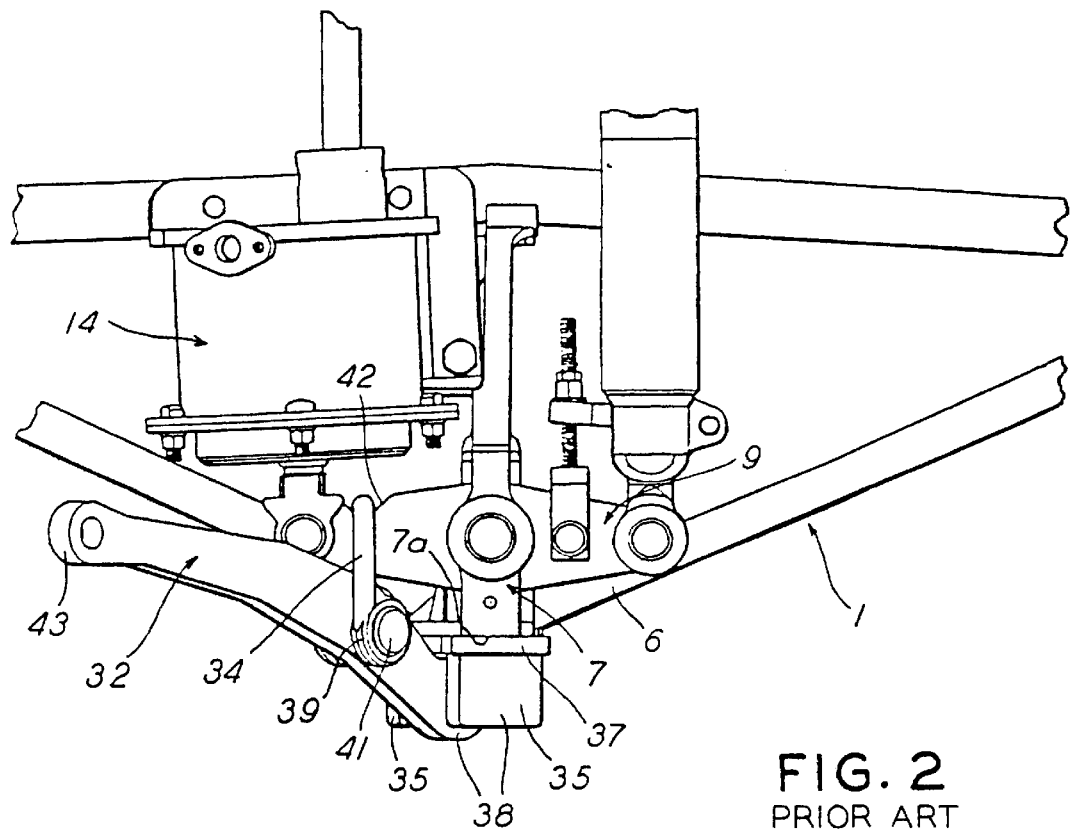
FIG. 2 is a plan view of the brake assembly of FIG. 1.
Figure 3:
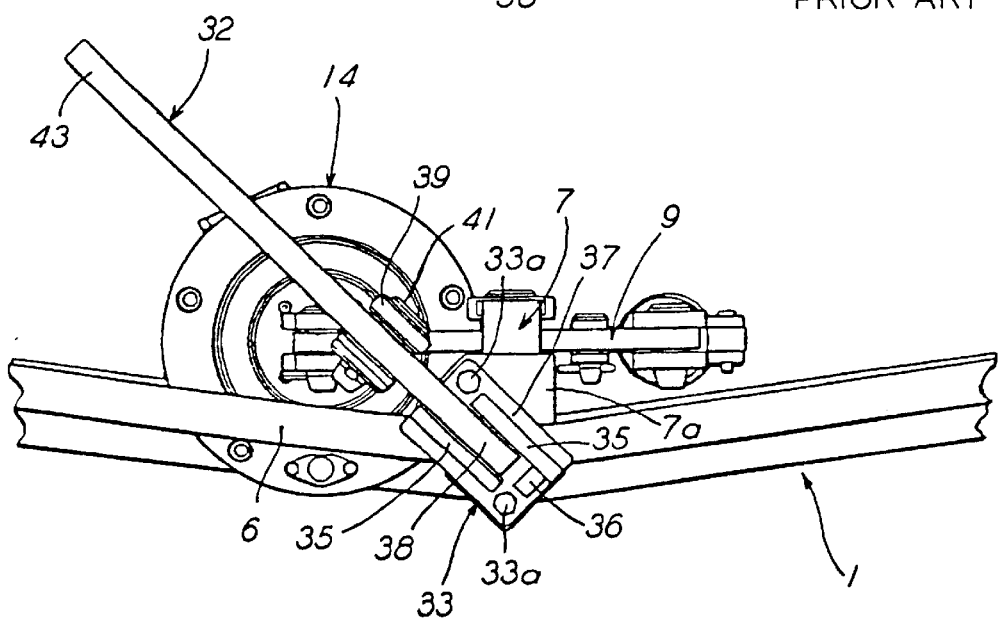
FIG. 3 is an elevation view of the brake assembly of FIG. 1.

Referring is FIGS. 1, 2 and 3 of the drawings, there is shown a railway car brake rigging including a pair of parallel brake beams 1 and 2 that are adapted to be mounted on the truck (not shown) of a railway car by guide feet 3 that are formed on removable brake heads 4 of the respective beams. The brake heads 4 are mounted on the ends of the brake beams and carry brake shoes (not shown) for engagement with the wheels of the railway car truck. Guide channels in the truck side frames are arranged to receive the brake beam guide feet 3 in a well-known manner to support the brake beams and to guide the brake shoes into proper braking engagement with the wheel treads.

Brake beams 1 and 2 may be a conventional, truss design comprising a compression member 5, a tension member 6, and a strut member 7. The compression and tension members 5 and 6 are welded together at their outer extremities to which brake heads 4 are removably-fixed, as by rivets or other suitable fasteners. Strut member 7 is rigidly-connected between the compression and tension members at their midpoints. Being of relatively lightweight construction, such design is well-known to provide a low-cost brake beam capable of supporting high brake forces.

In the preferred construction of brake beams 1 and 2, as employed in the present invention, the brake beams are bent at their midpoint so as to be V-shaped, as disclosed in U.S. Pat. No. 4,830,148, and assigned to the assignee of the present invention.

Such an arrangement better accommodates mounting of the brake rigging components without encountering interference with the brake beam members, while as the same time allowing the brake application force to be applied in line with the brake shoe force to avoid brake beam torque.

Pivotally-mounted by a pin 8 on an upraised portion of strut member 7, in the proximity of tension member 6, is a transfer lever 9 associated with brake beam 1. Similarly, a transfer lever 10 is pivotally-mounted by a pin 11 to an upraised portion of strut member 7 associated with brake beam 2. In mounting these transfer levers 9 and 10 above the tension member 6, the transfer levers 9 and 10 may be located in proximity with the tension member of the respective beams without encountering interference therewith upon rotation of the transfer levers. The aforementioned bent-beam concept allows the transfer levers to be upraised from the beam midpoint, while still maintaining these levers in a plane common to the brake beam ends, at which point the brake shoe force is applied without imparting braking torque to the beam.

Corresponding arms of transfer levers 9 and 10 are interconnected through force-transmitting members 12 and 13.

Force-transmitting member 12 includes a pneumatic actuator device, such as a conventional, piston-type brake cylinder 14 having a pressure head 15 and a non-pressure head 16.

Brake cylinder 14 is suitably mounted to brake beam 1 by being bolted or otherwise fixed to the beam compression member 5, at a location on one side of strut member 7 between compression member 5 and tension member 6. Alternatively, brake cylinder 14 may be carried by the brake rigging without mounting directly to the brake beam, particularly where a lightweight-type brake cylinder, such as an expansible air bag, is employed. A piston push rod 19 is connected by a pin 18 to an arm 19 of transfer lever 9, while one end of a connecting rod 20 is connected by a pin 21 to arm 22 of transfer lever 10.

The other end of connecting rod 20 is pinned to a lug 23 of brake cylinder pressure head 15 via an enlarged hole 23a. This swivel connection accommodates relative vertical and lateral movement of the respective brake beams and associated links without binding at the brake cylinder-connecting rod joint.

Force-transmitting member 13 may be a simple connecting rod or, as shown here, a slack adjuster device 24, such as the slack adjuster device disclosed in U.S. Pat. No. 4,662,485, assigned to the assignee of the present invention. One end 25 of the slack adjuster body is connected to arm 26 of transfer lever 9 by a pin 27, while the opposite end 28, associated with an actuating rod 29 that is axially movable relative to the slack adjuster housing, is connected by a pin 30 to arm 31 of transfer lever 10. A trigger arm 47 is pivotally-mounted to the slack adjuster housing so as to be normally spaced-apart from a stop nut 48 on a threaded stem of a reference member 49 that is in turn fixed to transfer lever 9.

Cooperatively, arranged with the above-described brake rigging is a prior art hand brake mechanism comprising an actuating lever 32, a thrust block 33, and a U-shaped transfer link 34. Thrust block 33 is fastened to the end 7a of strut member 7 adjacent tension member 6 in a suitable fashion, as by cap screws 33a, and includes a pair of spaced-apart, parallel, side walls 35 and a bottom wall 36 that project from a base 37. The side walls 35 are disposed at an angle to the vertical and form with bottom wall 36 a pocket in which the fulcrum end 38 of actuating lever 32 is contained with limited freedom of motion. Actuating lever 32 is mounted on transfer lever 9 through the intermediary of transfer link 34, which has a clevis 39 at its one end and an opening 40 at its other end through which arm 19 of transfer lever 9 passes. The clevis end of transfer link 34 is pivotally-connected to actuating lever 32 by a pin 41 and is twisted relative to the end having opening 40, in order to support actuating lever 32 at an angle with transfer lever 9 corresponding to the angle formed by walls 35 of thrust block 33. Transfer lever 9 is formed with an angular groove 42 in its one side conforming to the twisted end of transfer link 34 having opening 40. This groove 42 serves to properly locate and maintain the position of transfer link 34, which in turn establishes the attitude of actuating lever 32 relative to the attitude of transfer lever 9. The angular attitude of actuating lever 32 relative to the horizontal attitude of transfer lever 9 is selected to optimize the lever ratio of both the actuating lever 32 and transfer lever 9 when operated by the actuating lever, as hereinafter explained, and thereby provides such mechanical advantage a required for the hand brake system. The end 43 of actuating lever 32 opposite fulcrum end 38 is adapted to be connected to a hand brake chain of a railway car hand brake (not shown).

The prior art fulcrum end 38 of actuating lever 32, as shown in FIGS. 4, 5 and 6, is arranged with two arcuate segments 44 and 45 separated by a flat 46. Each of these arcuate segments 44 and 45 lies adjacent base 37 of thrust block 33, one or the other being adapted to engage the base 37, depending on the position of the actuating lever in its operating range, to provide a fulcrum about which the lever is pivotable. Depending upon which arcuate segment is providing the fulcrum, a mechanical advantage corresponding to either a 3.962:1 lever ratio or a 3.095:1 lever ratio, for example, may be obtained. While the radii of the arcuate segments may differ, the radius of each respective segment is the same throughout. For this reason, and the fact that the clevis pin hole 41a in lever 32 is constrained to move in a horizontal plane, due to its connection with transfer lever 9 via transfer link 34, during lever rotation, one lever ratio remains in effect, depending upon which arcuate segment is engageable with base 37 of thrust block 33, until instantaneously the other arcuate segment is rotated into engagement with the thrust block base 37 to cause the other lever ratio to become effective.

Figure 7:
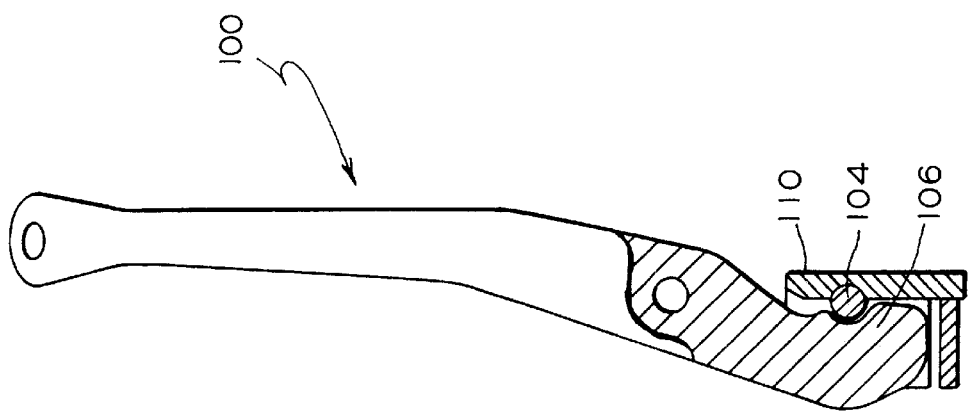
FIGS. 7 and 8 illustrate the presently preferred embodiment of the hand brake lever according to the present invention.
Figure 8:
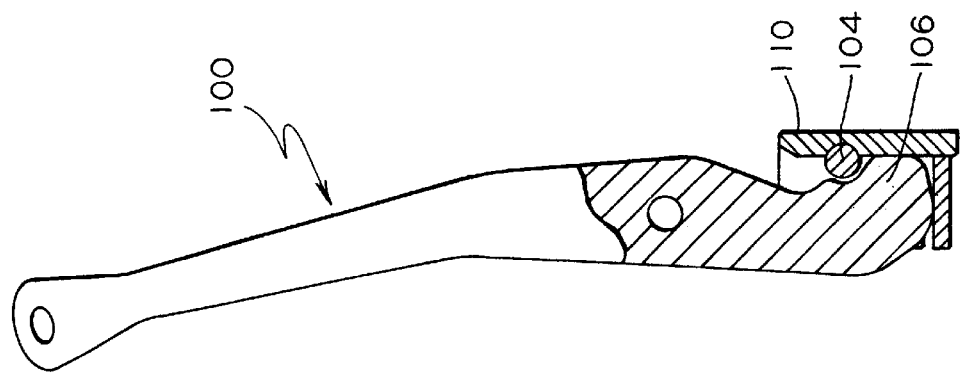
Figure 9:
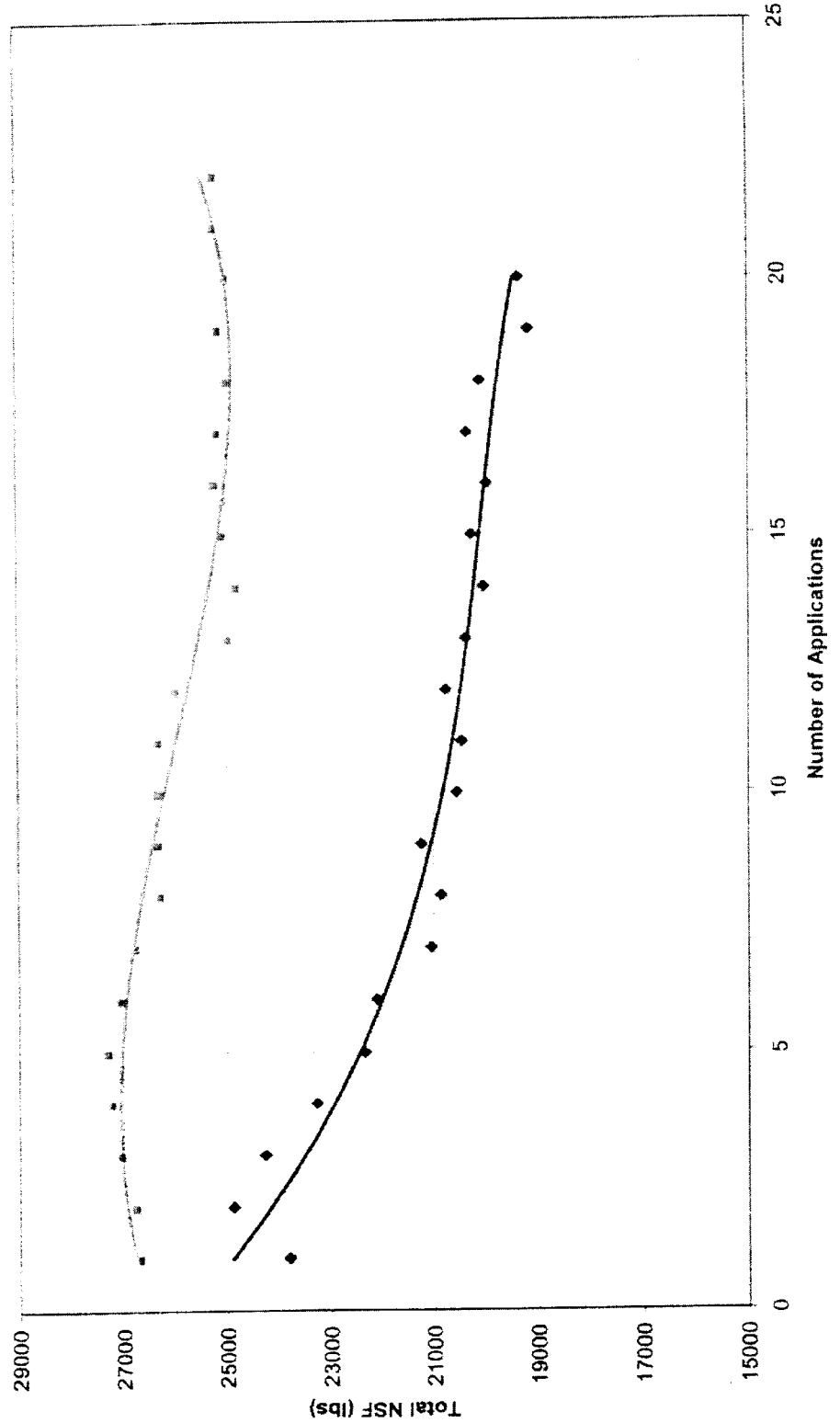
FIG. 9 is a graph illustrating the substantially improved performance of the present and preferred hand brake lever in comparison to the prior art hand brake lever.

Reference is now made more particularly to FIGS. 7 and 8. Illustrated therein is a presently preferred embodiment of the hand brake lever, generally designated 100, which includes an arcuate shaped portion 106. The purpose of such arcuate shaped portion 106 will be explained infra. Also illustrated in FIGS. 7 and 8 is a presently preferred embodiment of the thrust block 110 having pin 104 disposed therein around which the arcuate shaped portion 106 of lever 100 rotates.

The purpose of automatically changing the lever ratio, as hand brake lever 32 rotates through its operating range, is to limit its range of rotation, in order to prevent interference with the truck axle, which could otherwise occur. Release position of hand brake lever 32 is shown in FIG. 4, full application position is shown in FIG. 6, and an intermediate position is shown in FIG. 5. Also, in FIGS. 4 and 6, the intermediate position of the hand brake lever 32 is shown in phantom to show the degree of movement of hand brake lever 3 from release position to the intermediate position (FIG. 4) and from application position to the intermediate position (FIG. 6). In FIG. 4, this movement is indicated at end 43 of hand brake lever 32 by distance X and in FIG. 6 by distance X', distance X being greater than distance X' due to the greater lever ratio effective in FIG. 4, as compared to FIG. 6, for a given degree of movement of clevis pin hole 41a.

As is well-known, the hand brake chain normally operates through a bellcrank lever (not shown) that provides fast take-up initially with low mechanical advantage and subsequently slow take-up with high mechanical advantage. It will be appreciated that the changeover between the respective fulcrum points of the hand brake lever is designed to occur so that arcuate segment 45, corresponding to the lower lever ratio of hand brake lever 32, is effective during such time as the hand brake chain is operating in the slow take-up region of the hand brake bellcrank lever (high M.A.) and vice versa.

The brakes, according to the present invention, operate through the brake rigging in response to either the supply and release of compressed air at brake cylinder device 14, or in response to operation of the railway car hand brake wheel.

In the case of a pneumatic brake application in response to the supply of compressed air to brake cylinder 14, push rod 17 is forced to move in the direction of the left hand relative to the brake cylinder body, which is fixed to compression member 5 of brake beam 1.

Similarly, rotation of end 43 of actuating lever 32 in a counterclockwise direction, as viewed in FIG. 1, when the hand brake chain is taken up in a well-known manner, forces fulcrum end 38 of the actuating lever to contact base 37 of thrust block 33, thereby pulling transfer lever 9 via transfer link 34. In that transfer link 34 is connected to arm 19 of transfer lever 9, as is push rod 17, it will be apparent that in the case of both a pneumatic brake application and a hand brake operation, transfer lever 9 is forced to rotate in a counterclockwise direction as viewed in FIG. 1.

This counterclockwise rotation of transfer lever 9 results in force-transmitting member 13 being moved in the direction of the right hand to, in turn, effect counterclockwise rotation of transfer lever 10 about its pivot pin 11. In that connecting rod 20 of force-transmitting member 12 abuts lug 23 formed on the pressure head of the brake cylinder 14, resistance to movement is encountered at the end of transfer lever 10 connected to connecting rod 20 by pin 21, so that transfer lever 10 acts as a second-class lever. Thus, the force exerted at the other end of transfer lever 18 by force-transmitting member 13 causes transfer lever 10 to pivot in a counterclockwise direction about its pin 11 to thereby move brake beam 2 in the direction of the right-hand through the connection of transfer lever 10 with strut member 7, bringing the brake shoes of brake head 4 associated with brake beam 2 into engagement with its associated wheel treads.

Once brake shoe engagement occurs at brake beam 2, the connection of transfer lever arm 26 with force-transmitting member 13 at its pin 27 becomes solid and transfer lever 9 also becomes a second-class lever. This causes the counterclockwise rotation of transfer lever 9 to take place by pivotal rotation about the pin connection 27 of transfer lever 9 with force-transmitting member 13. Accordingly, the applied hand brake force acts through pin 8 of transfer lever 9 and strut member 7 to force brake beam 1 in the direction of the left-hand, thereby bringing the brake shoes of brake head 4 associated with brake beam 1 into braking engagement with its associated wheel treads.

In that slack adjuster device 24 has been previously disclosed in U.S. Pat. No. 4,662,485, it should suffice to say here that during a hand brake application, as explained, slack adjuster device 24 is capable of supporting the compressive forces exerted on force-transmitting member 13, of which slack adjuster 24 is an integral part, since in the absence of overtravel due to brake shoe wear, trigger arm 47 remains disengaged from stop nut 48. It should also be noted that in the event overtravel does exist due to brake shoe wear having occurred during a preceding brake application, engagement of trigger arm 47 of the slack adjuster device 24 with stop nut 48 will occur prior to brake shoe/wheel tread engagement to initiate the slack adjuster action.

When the brake application is released, the respective brake beams are moved by the force of gravity and by the brake cylinder release spring (not shown) down the inclined guide pockets in the truck side frame toward a retracted position in which the brake shoes of the respective brake beams are maintained a predetermined distance apart from the associated wheel tread braking surface. During the initial release movement, slack adjuster device 24 reacts to the actuated trigger arm 47 to further extend the slack adjuster until the trigger arm 47 is pivoted out of engagement with stop nut 48. When this occurs, sufficient slack will have been taken up to compensate for any brake shoe wear and the slack adjuster will now lock-up, so as to support the force exerted through the rigging as the brake beams continue to be retracted. This retraction of the brake beams to move the brake shoes out of engagement with the wheel treads results in movement of the transfer lever arms 26 and 31 and force-transmitting members 12 and 13, as well as brake beams 1 and 2, in a manner opposite to that occurring during application of the brakes.

It will be appreciated that, by affixing the one side of brake cylinder 14 to brake beam 1 at compression member 5 and having the slack adjuster trigger arm 47 sense stop nut 48 on transfer lever 9, the relationship between the trigger arm and the shoe-wear reference point provided by stop nut 48 remains constant for any given position of the brake beams, thereby assuring an accurate reading of brake shoe wear and consequent slack take-up by the slack adjuster operation.

In addition, the fact that the hand brake force acts through the brake rigging the same way as does the brake cylinder application force, the braking force in each instance is applied at the midpoint of the respective beams, that is, at the strut member 7 thereof, in keeping with the desire to utilize conventional, low-cost type brake beams.

During this aforementioned rotation of hand brake lever 32 through its full operating range, as shown in FIGS. 4, 5 and 6, it will be noted that arcuate segment 44 is initially engaged with base 37 of thrust block 33 to provide the fulcrum point about which hand brake actuating lever 32 pivots during rotation. Hand brake actuating lever 32 thus acts as a second-class lever having a primary lever ratio determined by the distance between the hand brake chain connection at end 43 and the fulcrum point at arcuate segment 44 compared to the distance between clevis pin 41 and the fulcrum point at arcuate segment 44.

At some given position intermediate the extreme limits of rotation of hand brake actuating lever 32, the lever attitude is such as to place flat 46 against base 37 of thrust block 33. Continued rotation of hand brake actuating lever 32 from this intermediate position causes arcuate segment 45 to engage base 37 of thrust block 33 and arcuate segment 44 to disengage base 37.

Consequently, the initial, primary lever ratio is instantaneously reduced to a secondary lever ratio that is determined by the distance between the hand brake chain connection at end 43 and the fulcrum point at arcuate segment 45, as compared to the distance between clevis pin 41 and the fulcrum point at arcuate segment 45.

The primary lever ratio is selected to actuate the brake rigging with normal handwheel force, during which time the hand brake bellcrank lever (not shown) is providing low mechanical advantage. Following changeover of the hand brake lever fulcrum point from arcuate segment 44 to arcuate segment 45, the secondary lever ratio becomes effective to produce a relatively short range of motion at end 43 of hand brake lever 32 for the same given unit of motion of transfer link 34, as compared to when the fulcrum point is provided by arcuate segment 44. The result of this dual lever ratio is to reduce the total range of travel of hand brake lever 32 between brake release and application positions, in order to prevent interference with the adjacent axle.

This is achieved without having to exert excessive handwheel force, since the mechanical advantage provided by the hand brake bellcrank increases during such time as the hand brake lever 32 is operated in accordance with its secondary lever ratio.

Because of the angle of rotation of transfer lever 9 to which hand brake actuating lever 32 is fixed through transfer link 34, actuating lever 32 is constrained to shift laterally in the plane of rotation of transfer lever 9. In allowing fulcrum end 38 of hand brake lever 32 to float free, however, it will be appreciated that different points of engagement with base 37 of thrust block 33 can occur, to accommodate the angularity of transfer lever 9.

Further, in allowing such sliding engagement of fulcrum end 38 of hand brake actuating lever 32 with base 37 of thrust block 33, as provided by one or the other of the arcuate segments 44, 45, the changing hand brake actuating lever angularity during hand brake operation can be accommodated without causing any binding of the brake rigging components.

In accordance with the foregoing, this sliding engagement of fulcrum end 38 with the bearing surface provided by base 37 of thrust block 33 occurs as a result of the angle of rotation of both hand brake actuating lever 32 and transfer lever 9, on which transfer link 34 is fixed, and therefore has a motion that reflects the angularity of both the transfer and hand brake levers.

In addition to eliminating binding of the brake rigging components, the free-sliding fulcrum end of hand brake lever 32 further eliminates torque force that would otherwise be imparted to the brake beam.

The side walls 35 and bottom wall 36 of thrust block 33 form a pocket within which fulcrum end 38 has limited free movement, these walls being provided to prevent fulcrum end 38 from becoming inadvertently entangled in the brake rigging under extreme conditions of stress, such as might occur, for example, during the quick release operation of a handwheel device when the hand brake chain tension is suddenly released.

I claim:

1. In combination with a hand brake system for a railway vehicle including first and second spaced-apart brake beams, first and second transfer levers pivotally connected at a point intermediate the ends thereof to a respective one of said first and second brake beams, first and second force-transmitting means interconnected between corresponding arms of said first and second transfer levers, said first force-transmitting means including brake actuator means operable in response to the supply of fluid pressure thereto for increasing the length of said first force-transmitting means, to accordingly increase the spaced-apart distance between said first and second brake beams, a transfer link connected to said first transfer lever so as to be arcuately movable therewith in a plane parallel to the plane of rotation of said first transfer lever, the improvement comprising a thrust block disposed on said first brake beam, said thrust block having a pin member disposed therein, and an actuating lever having a pivotal connection at a location intermediate the ends thereof with said transfer link, closely adjacent one end of said actuating lever there is an arcuate portion rotateably engageable with said pin member and being adapted to receive a hand brake force.

2. A handbrake system, as recited in claim 1, wherein said ether end of said actuating lever comprises first and second arcuate segments spaced different distances from said pivotal connection of said actuating lever with said transfer link.

3. A handbrake system, as recited in claim 2, wherein at least said first brake beam comprises a compression member, a tension member connected to said compression member at the respective ends thereof, and a strut member interposed between said compression and tension members at the midpoints thereof.

4. A hand brake system, as recited in claim 3, a wherein said thrust block connected to said first brake beam at the juncture of said strut member and said tension member, includes:

(a) a base providing said a bearing surface;
   (b) a pair of spaced-apart parallel side walls projecting from said base; and
   (c) a bottom wall projecting from said base intermediate said first and second side walls and cooperating therewith to form a pocket within which said other end of said actuating lever is engageable.

5. A hand brake system, as recited in claim 2, wherein said fulcrum point provided by said first arcuate segment establishes a first lever ratio of said actuating lever and said fulcrum point provided by said second arcuate segment establishes a second lever ratio of said actuating lever that is less than said first lever ratio.

6. A hand brake system, as recited in claim 1, wherein at least said first brake beam comprises a compression member, a tension member connected to said compression member at the respective ends thereof, and a strut member interposed between said compression and tension members at the midpoints thereof.

7. A hand brake system, as recited in claim 6, wherein said pivotal connection of said first transfer lever with said first brake beam is at said strut member.

8. A hand brake system, as recited in claim 7, wherein said transfer link is connected to said first transfer lever at a point adjacent said pivotal connection of said first transfer lever with said strut member such that said actuating lever is disposed at an angle relative to the plane of rotation of said first transfer lever.

9. A hand brake system, as recited in claim 8, a wherein said thrust block connected to said first brake beam at the juncture of said strut member and said tension member, includes:
   (a) a base;
   (b) a pair of spaced-apart parallel side walls projecting from said base; and
   (c) a bottom wall projecting from said base intermediate said first and second side walls and cooperating therewith to form a pocket within which said other end of said actuating lever is engageable.

10. A hand brake system, as recited in claim 9, wherein said pair of side walls have an angle of inclination corresponding to said angle at which said actuating lever is disposed relative to said first transfer lever.

11. A hand brake system, as recited in claim 10, wherein the distance between said side walls is sufficiently greater than the corresponding dimension of said actuating lever as to permit movement thereof with said arcuate movement of said transfer link without said actuating lever encountering said side walls.

12. A hand brake system, as recited in claim 8, wherein said transfer link is U-shaped, a bight portion thereof terminating in a bifurcated portion to which said actuating lever is connected to provide said pivotal connection thereof with said transfer link, said bight portion forming an opening through which said first transfer lever passes, said bight portion being twisted relative to said bifurcated portion, the degree of twist corresponding to said angle at which said actuating lever is disposed relative to the plane of rotation of said first transfer lever.

13. A hand brake system, as recited in claim 12, wherein said first transfer lever is formed with a groove in which said bight portion of said transfer link is engaged to fix said angle at which said actuating lever is disposed relative to said first transfer lever.

14. A hand brake system, as recited in claim 13, wherein said end of said actuating lever comprises first and second arcuate segments spaced different distances from said pivotal connection of said actuating lever with said transfer link, said first arcuate segment being engageable with said bearing surface to provide said fulcrum point about which said actuating lever is rotatable in a first range of rotation thereof and said second arcuate segment being engageable with said bearing surface to provide said fulcrum point about which said actuating lever is rotatable in a second range of rotation thereof.

15. A hand brake system, as recited in claim 14, wherein said fulcrum point provided by said first arcuate segment establishes a first lever ratio of said actuating lever and said fulcrum point provided by said second arcuate segment establishes a second lever ratio of said actuating lever that is less than said first lever ratio.

16. A hand brake system, as recited in claim 15, wherein said thrust block connected to said first brake beam at the juncture of said strut member and said tension member, includes:
   (a) a base;
   (b) a pair of spaced-apart parallel side walls projecting from said base; and
   (c) a bottom wall projecting from said base intermediate said first and second side walls and cooperating therewith to form a pocket within which said other end of said actuating lever is engageable.

17. A hand brake system, as recited in claim 16, wherein said pair of side walls have an angle of inclination corresponding to said angle at which said actuating lever is disposed relative to the plane of rotation of said first transfer lever.

18. A hand brake system, as recited in claim 17, wherein the distance between said side walls sufficiently greater than the corresponding dimension of said actuating lever as to permit movement thereof with said arcuate movement of said transfer link without said actuating lever encountering said side walls.

* * * * *